(12) United States Patent
Kim et al.

(10) Patent No.: US 10,216,282 B2
(45) Date of Patent: Feb. 26, 2019

(54) DISPLAY DEVICE WITH A MOVEABLE PHOTOGRAPHING ASSEMBLY

(71) Applicant: SAMSUNG ELECTRONICS CO., LTD., Suwon-si, Gyeonggi-do (KR)

(72) Inventors: Hak-young Kim, Yongin-si (KR); Go-hyun Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/112,016

(22) PCT Filed: Dec. 29, 2014

(86) PCT No.: PCT/KR2014/012974
§ 371 (c)(1),
(2) Date: Jul. 15, 2016

(87) PCT Pub. No.: WO2015/130004
PCT Pub. Date: Sep. 3, 2015

(65) Prior Publication Data
US 2016/0334878 A1    Nov. 17, 2016

(30) Foreign Application Priority Data

Feb. 28, 2014    (KR) .................. 10-2014-0024428

(51) Int. Cl.
*G06F 3/01*    (2006.01)
*G06F 1/16*    (2006.01)
(Continued)

(52) U.S. Cl.
CPC ............ *G06F 3/017* (2013.01); *G06F 1/1605* (2013.01); *G06F 3/005* (2013.01); *G06F 3/0304* (2013.01); *H04N 5/64* (2013.01)

(58) Field of Classification Search
CPC ........ G06F 3/005; G06F 3/017; G06F 1/1605; G06F 1/1607; G06F 3/0304
(Continued)

(56) References Cited

U.S. PATENT DOCUMENTS 6,323,902 B1 *  11/2001  Ishikawa ............... G06F 1/1607
                                              248/918
6,510,286 B1    1/2003   Terada et al.
(Continued)

FOREIGN PATENT DOCUMENTS

EP      2 533 516 B1      10/2013
JP      62-102059          6/1987
(Continued)

OTHER PUBLICATIONS

International Search Report dated Mar. 11, 2015 in corresponding International Application No. PCT/KR2014/012974.
(Continued)

*Primary Examiner* — Alexander Eisen
*Assistant Examiner* — Nelson Lam
(74) *Attorney, Agent, or Firm* — Staas & Halsey LLP

(57) ABSTRACT

A display device for providing user interaction is disclosed. The disclosed display device comprises: a display body; a photographing unit including a camera module for detecting a user's gesture; and a driving unit for selectively moving the photographing unit to a first position where the photographing unit is received in the display body and to a second position or a third position where the photographing unit projects outward from the display body during photographing, wherein the driving unit keeps the photographing unit fixed at a certain point in the section between the second position and the third position.

13 Claims, 16 Drawing Sheets

(51) Int. Cl.
*G06F 3/03* (2006.01)
*G06F 3/00* (2006.01)
*H04N 5/64* (2006.01)

(58) Field of Classification Search
USPC .................... 345/87–104, 156–166; 348/207.1–207.11, 373–376
See application file for complete search history.

(56) References Cited

U.S. PATENT DOCUMENTS

| | | | |
|---|---|---|---|
| 6,812,958 B1 | 11/2004 | Silvester | |
| 6,970,202 B1* | 11/2005 | Glogan | F16M 13/02 348/207.1 |
| 9,313,381 B2* | 4/2016 | Kim | H04N 5/2257 |
| 9,529,441 B2* | 12/2016 | Kim | G06F 3/017 |
| 9,606,617 B2* | 3/2017 | Kim | G06F 3/017 |
| 2002/0176020 A1* | 11/2002 | Kawaguchi | G03B 17/00 348/373 |
| 2005/0014527 A1 | 1/2005 | Chambers et al. | |
| 2006/0269278 A1* | 11/2006 | Kenoyer | F16M 11/10 396/428 |
| 2007/0110430 A1* | 5/2007 | Shi | G03B 17/02 396/428 |
| 2007/0253703 A1* | 11/2007 | Tsai | G03B 17/02 396/429 |
| 2008/0012944 A1* | 1/2008 | Lu | H04N 5/2252 348/207.1 |
| 2008/0085112 A1* | 4/2008 | Lane | G03B 17/04 396/349 |
| 2008/0183932 A1* | 7/2008 | Hsu | G06F 1/1605 710/300 |
| 2008/0244862 A1* | 10/2008 | Tooyama | E05F 5/003 16/82 |
| 2010/0130272 A1* | 5/2010 | Im | H04M 1/0237 455/575.4 |
| 2011/0050910 A1* | 3/2011 | Fan | H04N 5/2252 348/207.1 |
| 2012/0120236 A1* | 5/2012 | Xiao | H04N 5/2251 348/143 |
| 2012/0127257 A1* | 5/2012 | Lu | H04N 7/142 348/14.01 |
| 2013/0163170 A1* | 6/2013 | Chen | G03B 29/00 361/679.4 |
| 2013/0169528 A1* | 7/2013 | Jung | G06F 3/01 345/156 |
| 2013/0259462 A1* | 10/2013 | Yang | F16M 11/10 396/428 |
| 2013/0314593 A1 | 11/2013 | Reznik et al. | |
| 2014/0009628 A1 | 1/2014 | Jang et al. | |
| 2014/0232865 A1* | 8/2014 | Kim | G06F 3/017 348/143 |
| 2014/0240219 A1* | 8/2014 | Kim | G06F 3/017 345/156 |
| 2015/0029390 A1* | 1/2015 | Kim | H04N 5/2257 348/373 |
| 2015/0304532 A1* | 10/2015 | Bart | H04N 5/2252 348/373 |
| 2016/0205293 A1* | 7/2016 | Jung | H04N 5/2252 348/373 |

FOREIGN PATENT DOCUMENTS

| | | |
|---|---|---|
| JP | 2012-257162 | 12/2012 |
| KR | 1999-009159 | 3/1999 |
| KR | 20-0154872 | 5/1999 |
| KR | 2000-0020511 | 4/2000 |
| KR | 10-2013-0078301 | 7/2013 |
| KR | 10-2014-0005734 | 1/2014 |

OTHER PUBLICATIONS

Written Opinion dated Mar. 11, 2015 in corresponding International Application No. PCT/KR2014/012974.
Partial European Search report dated Dec. 15, 2017 in corresponding European Patent Application No. 14883704.0, 17 pgs.
Extended European Search Report dated Mar. 28, 2018 in European Patent Application No. 14883704.0.
European Communication dated Jan. 2, 2019 in European Patent Application No. 14883704.0.

\* cited by examiner

DISPLAY DEVICE WITH A MOVEABLE PHOTOGRAPHING ASSEMBLY

CROSS-REFERENCE TO RELATED APPLICATIONS

This application is a U.S. National Stage Application, which claims the benefit under 35 U.S.C. § 371 of PCT International Patent Application No. PCT/KR2014/012974, filed Dec. 29, 2014 which claims the foreign priority benefit under 35 U.S.C. § 119 of Korean Patent Application No. 10-2014-0024428, filed Feb. 28, 2014, the contents of which are incorporated herein by reference.

TECHNICAL FIELD

The present general inventive concept generally relates to a display device, and more particularly, to a display device for providing user interaction.

BACKGROUND OF THE INVENTION

With the recent prevalence of a smart interactive function, display devices providing user interaction have been developed and have come into wide use. The user interaction refers to an operation of controlling a display device by means of a user's gesture or voice. Accordingly, the display device includes a photographing unit for detecting the user's gesture or a small microphone for inputting the user's voice.

In the conventional art, the photographing unit is mounted on an upper end of the display device. That is, the photographing unit is exposed all the time on the upper end of the display device, which spoils the appearance of the display device. In addition, the exposed photographing unit may incur a user's displeasure that the photographing unit watches the user.

As an example of an effort to resolve the above problem, there is a display device in which a photographing unit is mounted slidably in a vertical direction on an upper end of a rear surface of the display device such that the photographing unit is not seen to the user while being out of use.

In this case, the photographing unit projects upwards from an upper end of the rear surface of the display device during photographing. The projected photographing unit slides down when being out of use so as not to be seen on the display device. The photographing unit is located on a front surface of the display device, receding by an amount of a thickness of a lateral surface of the display device. In this regard, the photographing unit needs to project further upwards in order to secure a greater view angle of a camera, which spoils the appearance of the display device.

As another example, there is a photographing unit that includes an angle control member for controlling an angle of a camera module in a vertical direction in order to adjust the view angle of the camera. In this case, a part of the angle control member is exposed to outside the photographing unit such that the user is able to control the angle. Accordingly, the photographing unit forms a through hole for physically passing the part of the angle control member. The through hole brings a circumjacent foreign substance into the photographing unit, and the foreign substance may contaminate a lens of the camera module or a window in front of the lens, which degrades image quality of the photographing unit.

Further, the angle control member mounted inside the photographing unit causes a limit in reducing criticality of the photographing unit. In addition, as the angle control member consists of a plurality of components, a process for assembling the components needs to be added, which raises a unit price of a product and deteriorates productivity.

DETAILED DESCRIPTION OF THE INVENTION

Technical Purpose

The present disclosure has been provided to address the aforementioned and other problems and disadvantages occurring in the related art, and an aspect of the present disclosure provides a display device for securing a greater view angle of a camera without spoiling the appearance of the display device.

In addition, another aspect of the present disclosure provides a display device that mounts a simple structure for controlling the view angle of the camera on an outside of the photographing unit so as to prevent a foreign substance, such as, dust, from being brought into the photographing unit and form the photographing unit to be compact.

Means for Resolving the Problems

According to an exemplary embodiment of the present disclosure, there is provided a display device for providing user interaction. The device includes a display body, a photographing unit including a camera module for detecting a user's gesture, and a driving unit for selectively moving the photographing unit to a first position where the photographing unit is received in the display body and to a second position or a third position where the photographing unit projects outward from the display body during photographing. The driving unit may keep the photographing unit fixed at a certain point in a section between the second position and the third position.

In response to the photographing unit moving from the first position to the second position, the driving unit may control a moving speed of the photographing unit and keep the photographing unit at a predetermined angle between the second position and the third position.

The driving unit may include a slider being hinge-engaged with the photographing unit, a locking member being included in the slider to fix a position of the slider such that the photographing unit is kept fixed at the first position, an elastic member for elastically supporting the slider such that the photographing unit moves from the first position to the second position, and a speed reducing member for, in response to the photographing unit moving from the first position to the second position, reducing a moving speed of the slider and keeping the predetermined angle of the photographing unit in the section between the second position and the third position.

The elastic member may support the slider elastically in a section between the first position and the second position.

The speed reducing member may be a rotary damper being gear-engaged with the slider.

The slider may include an engagement unit being gear-engaged with the rotary damper in the section between the first position and the second position and an extension unit being gear-engaged with the rotary damper in the section between the second position and the third position.

The slider may include a first elongated hole and a second elongated hole in which a first hinge protrusion and a second hinge protrusion are slidably inserted, on an upper part of the slider, the first hinge protrusion and the second hinge protrusion protruding from both sides of the photographing unit. The first elongated hole and the second elongated hole may be arranged symmetrically to each other and angled to a certain side.

The elastic member may be a torsion spring.

The driving unit may include a slider being hinge-engaged with the photographing unit, a locking member being included in the slider to fix a position of the slider such that the photographing unit is kept fixed at the first position, an elastic member for elastically supporting the slider such that the slider moves from the first position to the second position, a speed reducing member for, in response to the photographing unit moving from the first position to the second position, reducing a moving speed of the slider, and a friction member for keeping the photographing unit at the predetermined angle between the second position and the third position.

The friction member may pressurize a part of the slider elastically in the section between the second position and the third position. In this case, it may be preferred that the friction member comes into surface-contact with a certain surface of the upper part of the slider. The friction member may be fixed to the display body. In addition, the friction member may be made of rubber or synthetic resin with elasticity.

The second position may be an uppermost position when the photographing unit projects outward from the display body, and the third position may be a lowermost position when the photographing unit projects outward from the display body.

The photographing unit may include a slip-resistant unit on an outer circumferential surface for easy rotation control of the photographing.

According to an exemplary embodiment of the present disclosure, there is provided a display device for providing user interaction. The device includes a display body including a main casing and an auxiliary casing being detachably mounted on a rear surface of the main casing, a photographing unit being arranged in the auxiliary casing and including a camera module for detecting a user's gesture, and a driving unit being arranged in the auxiliary casing and connected to the photographing unit so as to operate with the photographing unit. The photographing unit may move to a first position where the photographing unit is received in the auxiliary casing by operating with the driving unit and to a second position or a third position where the photographing unit projects outward from the display body during photographing and may be kept fixed at a certain point in a section between the second position and the third position.

The driving unit may include a slider being hinge-engaged with the photographing unit and elastically being supported by the auxiliary casing in a direction of moving the photographing unit from the first position to the second position and a speed reducing member for, in response to the photographing unit moving from the first position to the second position, reducing a moving speed of the slider and keeping a predetermined angle of the photographing unit in the section between the second position and the third position.

The speed reducing member may be a rotary damper being gear-engaged with one side of the slider. The slider may include an engagement unit being gear-engaged with the rotary damper in the section between the first position to the second position and an extension unit being gear-engaged with the rotary damper in the section between the second position and the third position.

The driving unit may include a slider being hinge-engaged with the photographing unit and elastically being supported by the auxiliary casing in a direction of moving the photographing unit from the first position to the second position, a speed reducing member for, in response to the photographing unit moving from the first position to the second, reducing a moving speed of the slider, and a friction member for elastically pressurizing a part of the slider such that the photographing unit is kept at the predetermined angle between the second position and the third position.

DETAILED DESCRIPTION OF THE PREFERRED EMBODIMENT

Figure 1:
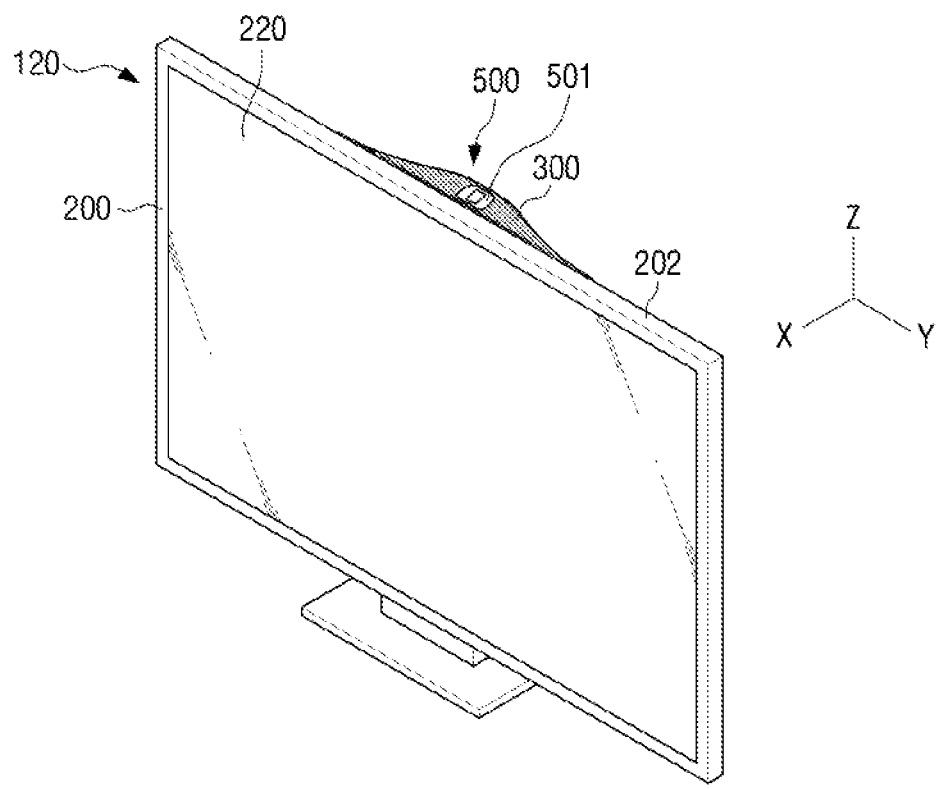
FIG. 1 is a perspective view illustrating a display device, provided to describe an example where a photographing unit of the display device is arranged at a first position, according to a first embodiment.

The present disclosure will become more apparent by the detailed description on the preferred embodiments with reference to the accompanying drawings. The embodiments and advantages in the following description are merely examples for better understanding of the present disclosure, and many alternatives, modifications, and variations may be applied to the invention of the present disclosure. In addition, the accompanying drawings are not based on an actual scale, and a size of some component shown in the drawings may have been exaggerated for better understanding of the present disclosure.

Figure 2:
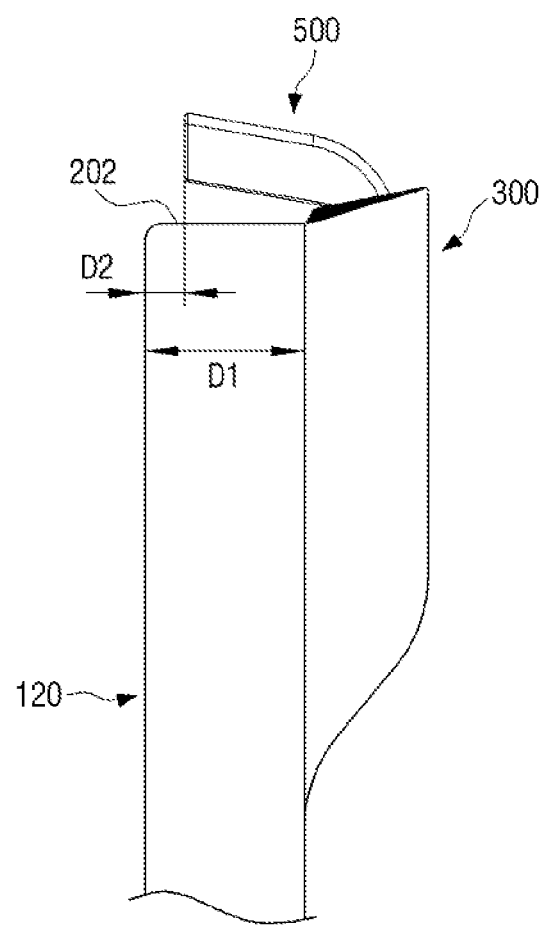
FIG. 2 is a side view of the display device, provided to describe an example where the photographing unit of the display device is arranged at a second position, according to the first embodiment.
Figure 3:
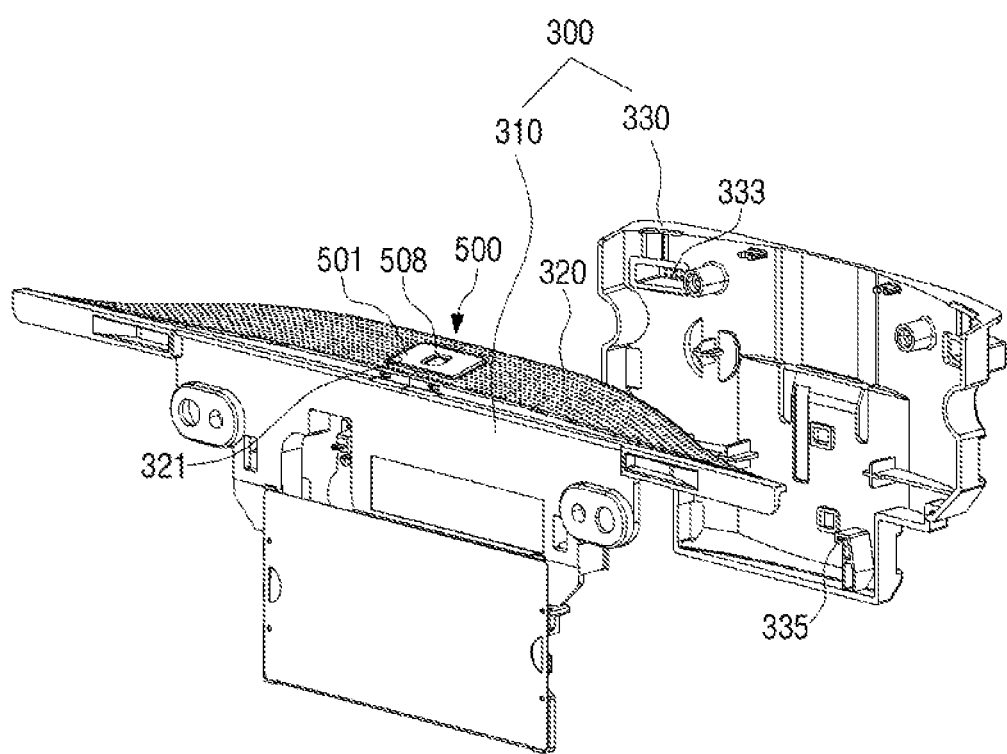
FIG. 3 is an exploded perspective view illustrating an auxiliary casing of FIG. 2.
Figure 4:
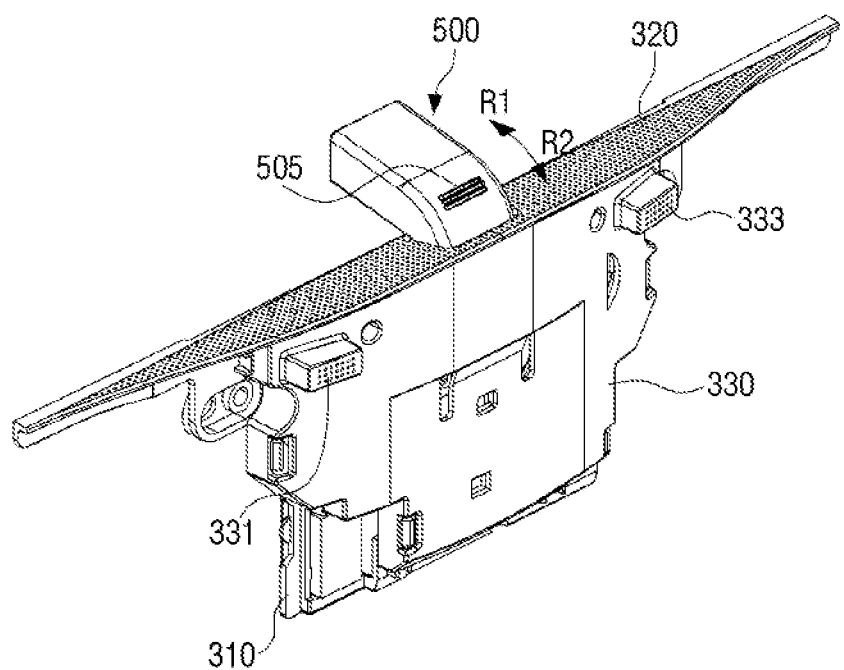
FIG. 4 is a perspective view illustrating a state where the photographing unit projects outward from the auxiliary casing.
Figure 5:
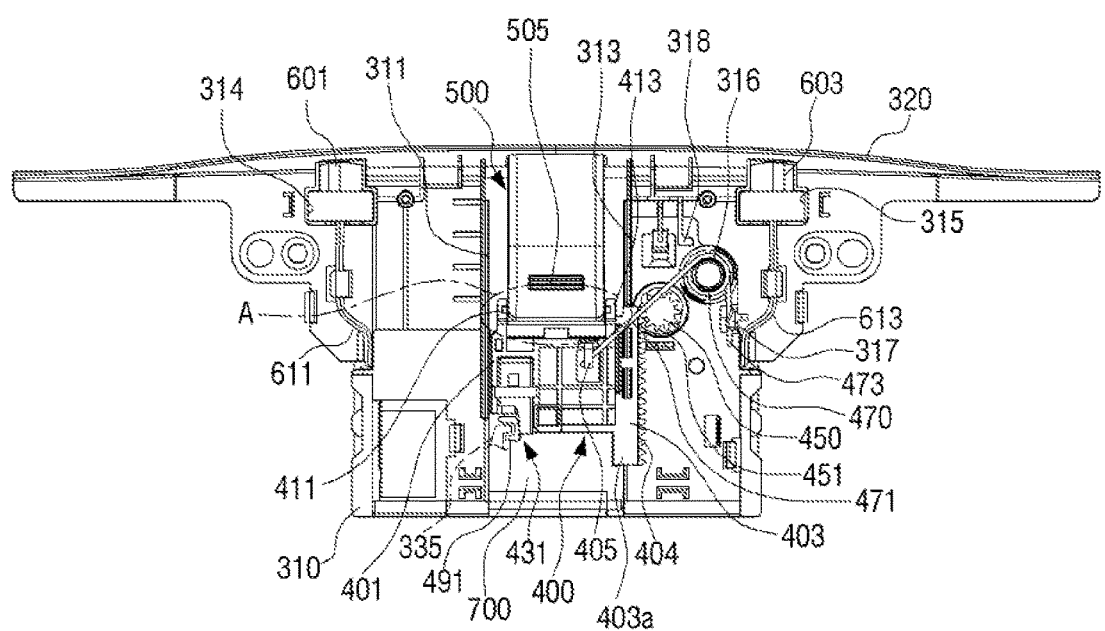
FIG. 5 is a diagram of the auxiliary casing without a rear casing, provided to describe an example where the photographing unit is arranged at the first position.
Figure 6:
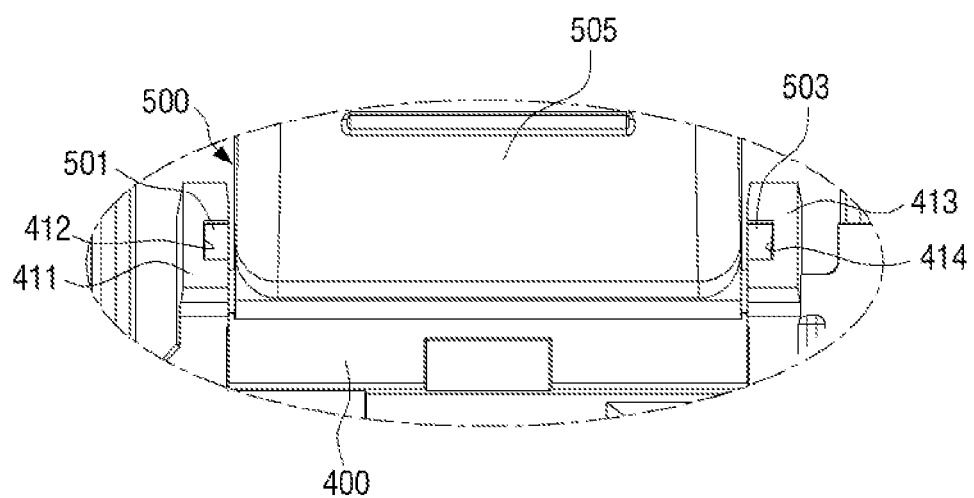
FIG. 6 is an expanded view of 'A' of FIG. 5.

FIG. 1 is a perspective view illustrating a display device, provided to describe an example where a photographing unit of the display device is arranged at a position, according to an embodiment. FIG. 2 is a side view of the display device, provided to describe an example where the photographing unit of the display device is arranged at a second position, according to an embodiment. FIG. 3 is an exploded perspective view illustrating an auxiliary casing of FIG. 2. FIG. 4 is a perspective view illustrating a state where the photographing unit projects outward from the auxiliary casing. FIG. 5 is a diagram of the auxiliary casing without a rear casing, provided to describe an example where the photographing unit is arranged at the first position. FIG. 6 is an expanded view of 'A' (a part illustrating a hinge-engagement structure between the photographing unit and a slider) of FIG. 5.

Referring to FIGS. 1 and 2, a display device 100 may detect various user's gestures or voice through user interaction and perform a variety of corresponding control operations. The control operations may include channel change, volume control, execution of an application, and so on, for example.

The display device 100 may be a flat panel display device including a Liquid Crystal Display (LCD) television, a Light Emitting Diode (LED) television, or an Organic Light-Emitting Diode (OLED) television. Alternatively, the display device 100 may be a flat panel display device that operates in other display method than the above-described methods. The display device 100 may be realized as a curved display device, not the flat panel display device, or as a flexible display device. The display device 100 may be realized as a monitor for a computer, not a television.

The display device 100 includes a display body 120 and a photographing unit 500.

The display body 120 includes a main casing 200 and an auxiliary casing 300. The display body 120 may further include a display panel, a control board, and a power board which are arranged inside the display body 120 and not illustrated in drawings.

The main casing 200 accommodates the components of the display device 100, such as, the above-described display panel, control board, and power board. The main casing 200 includes a top surface or surface 202 as shown in FIGS. 1 and 2.

As illustrated in FIG. 2, the main casing 200 has a certain thickness D1. The thickness D1 of the main casing 200 is determined such that a front end surface 501 of the photographing unit 500 does not project from a front surface of the main casing 200 and is arranged behind an image display surface 220 by an amount of a certain distance D2 while the photographing unit 500 projects outward from the auxiliary casing 300. Accordingly, the display device 100 may secure a greater view angle of the camera of the photographing unit 500 without spoiling its overall appearance.

The display panel displays an image. The display panel includes the image display surface 220 for displaying an image. A user is able to view diverse contents provided by the display device 100 through the image display surface 220.

The control board controls operations of the display device 100. The control board may control the operations of the display device 100 in response to a command according to the user interaction.

The power board supplies a proper level of voltage required by the display device 100.

The auxiliary casing 300 is mounted on an upper part of a rear surface of the main casing 200 and accommodates the photographing unit 500 inside the auxiliary casing 300. In the present embodiment, the auxiliary casing 300 is mounted on the rear surface of the main casing 200 in a detachable manner, but not limited thereto. The auxiliary casing 300 may form a display body with the main casing 200 as a single body.

Referring to FIGS. 3 and 4, the auxiliary casing 300 includes a front casing 310 and a rear casing 330.

The front casing 310 is engaged with the upper part of the rear surface of the main casing 200 of the display device 100. The front casing 310 has an opening 321 for passing the photographing unit 500 through on its upper surface 320. Consequently, the photographing unit projects outward from the auxiliary casing 300 (refer to FIG. 4) or is received in the auxiliary casing 300 (refer to FIG. 3), through the opening 321.

It is preferred that the opening 321 is formed to correspond to an outer shape of the photographing unit 500 such that a foreign substance is not brought into the auxiliary casing 300 through the opening 321.

Referring to FIG. 5, a driving unit for inserting the photographing unit 500 in the auxiliary casing 300 or for exserting the photographing unit 500 outward from the auxiliary casing 300, on a rear surface of the front casing 310. In this case, the driving unit may include a slider 400, a rotary damper 450 as a speed reducing member for reducing a moving speed of the slider 400, a torsion spring 470 for elastically supporting the slider 400, and a locking member 490. A detailed description on the above components of the driving unit will be provided below.

The front casing 310 includes first and second guide rails 311, 313 for guiding the slider 400 to slide in a linear direction.

The first and second guide rails 311, 313 are arranged in parallel to each other with a certain distance along the rear surface of the front casing 310. The first guide rail 311 comes into contact with one end portion 401 of the slider 400 slidably, and the second guide rail 313 is inserted into an engagement unit 403 formed on the other side of the slider 400 slidably.

The front casing 310 has first and second mounting grooves 314, 315 in which first and second microphones 601, 603 are inserted, on both sides of the rear surface of the front casing 310.

The rear casing 330 is engaged with a rear side of the front casing 310 and forms a rear surface of the auxiliary casing 300.

The rear casing 330 has first and second perforation units 331, 333 corresponding to the first and second mounting grooves 314, 315 or to the first and second microphones 601, 602, on both sides of a rear surface of the rear casing 330. Consequently, an external sound (for example, a user's voice corresponding to a command) may be effectively inputted into the first and second microphones 601, 602 through the first and second perforation units 331, 333.

The rear casing 330 includes a locking protrusion 335 for locking a hook 491 of the locking member 490 mounted on the slider 400 (refer to FIG. 3). The locking protrusion 335 protrudes from the rear casing 330.

Meanwhile, a certain space is formed between the front casing 310 and the rear casing 330. The space accommodates the components for the user interaction of the display device 100, such as, the driving unit for moving the photographing unit 500, the photographing unit 500, the first and second microphones 601, 603, and an interaction control board 700 for controlling the display device 100 by analyzing a user command inputted through the photographing unit 500 and the first and second microphones 601, 603.

The driving unit may include the slider 400, the rotary damper 450, the torsion spring 470, and the locking member 490.

The upper part of the slider 400 is hinge-engaged with the photographing unit 500. The slider 400 may move linearly in a vertical direction along the first and second guide rails 311, 313 and set the photographing unit 500 to be at the first to third positions.

Figure 10:
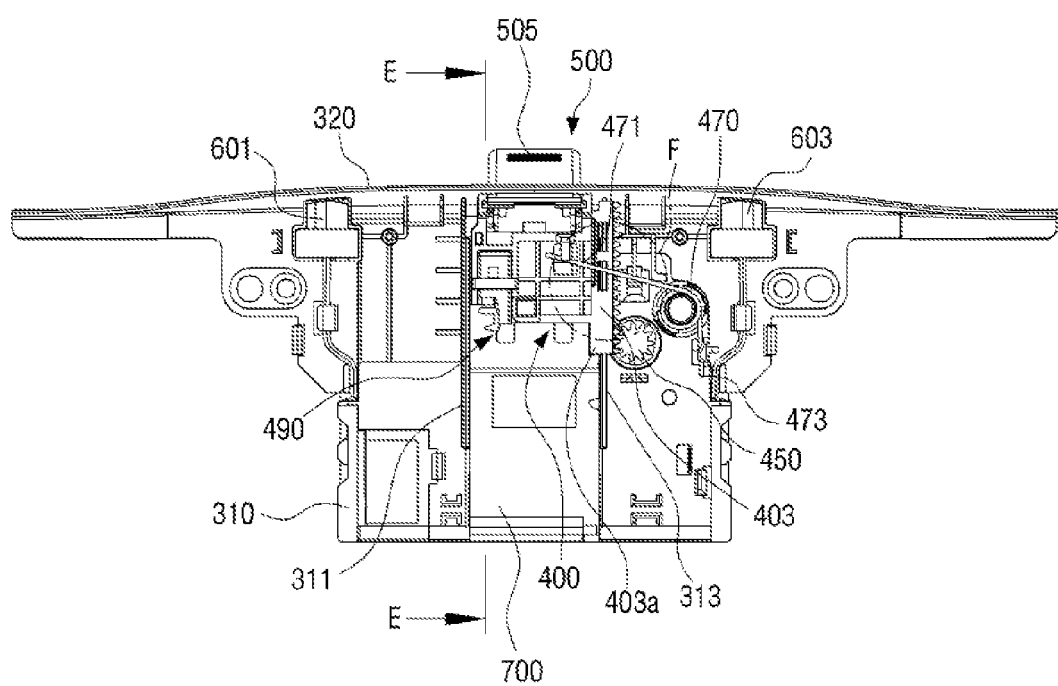
FIG. 10 is a diagram of the auxiliary casing without a rear casing, provided to describe an example where the photographing unit is arranged at a third position.
Figure 11:
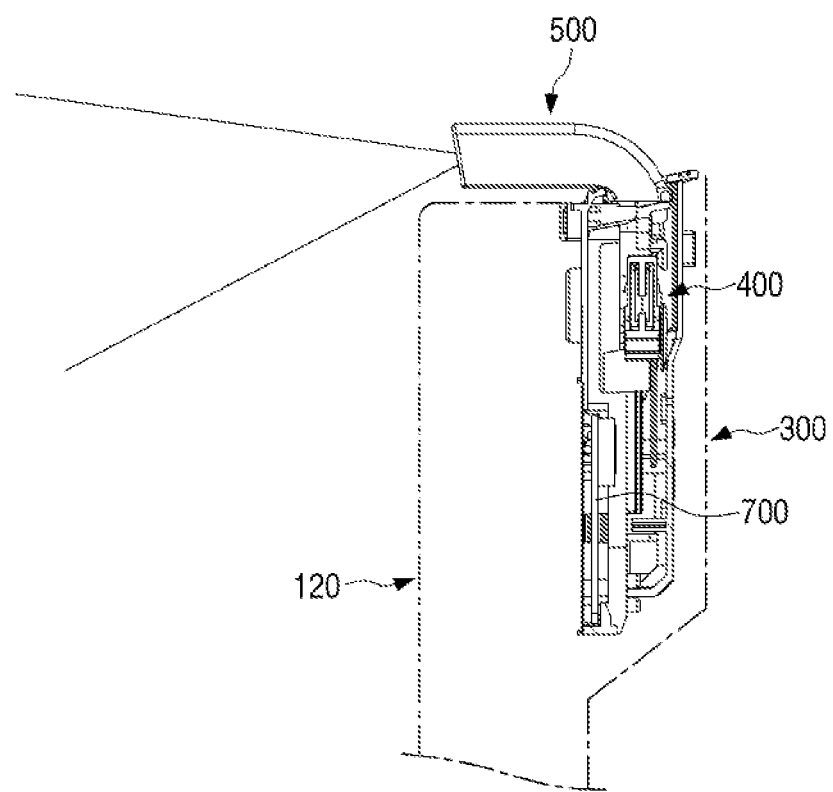
FIG. 11 is a sectional view taken along 'E-E' of FIG. 10.

In this case, it is defined that the first position is a position where the photographing unit 500 is received in the auxiliary casing 300 (refer to FIG. 5), the second position is a position where the photographing unit 500 projects outward from the auxiliary casing 300 (refer to FIGS. 7 and 8), and the third position is a position where a front end portion of the photographing unit 500 descends from the second position (refer to FIGS. 10 and 11).

In addition, the second position is an uppermost position that may be controlled by the user while the photographing unit 500 projects outward from the auxiliary casing 300, and the third position is a lowermost position that may be controlled by the user while the photographing unit 500 projects outward from the auxiliary casing 300.

Referring to FIG. 6, first and second connection units 411, 413 are arranged symmetrically with a certain distance on both sides of the upper part of the slider 400, and first and second elongated holes 412, 414 are formed along facing surfaces of the first and second connection units 411, 413.

In addition, first and second sliding protrusions 501, 503 protrude from both sides of a lower end of the photographing unit 500. The first and second sliding protrusions 501, 503 are slidably engaged with the first and second elongated holes 412, 414.

The first and second elongated holes 412, 414 are angled with respect to a longitudinal direction of the slider 400. That is, referring to FIG. 8, the first elongated hole 412 is angled at a certain angle in front of the slider 400. In this case, a lateral cross section of the second elongated hole 414 is not shown in the drawings. However, as the second elongated hole 414 is formed to be symmetrical to the first elongated hole 412, the second elongated hole 414 is angled at the same angle of the first elongated hole 412.

Referring back to FIG. 5, in response to the slider 400 moving from the first position to the second position, the slider 400 is gear-engaged with the rotary damper 450 for reducing the moving speed. For doing this, the engagement unit 403 formed on the other side of the slider 400 has a plurality of gear teeth 404. The plurality of gear teeth 404 are formed with the same distance along an outer side of the engagement unit 403 so as to be engaged with a gear unit 451 of the rotary damper 450.

The engagement unit 403 includes an extension unit 403*a* formed as a single body with the engagement unit 403 in a longitudinal direction of the engagement unit 403 from a lower end of the slider 400. In the same manner of the engagement unit 403, the extension unit 403*a* has the plurality of gear teeth 404 formed along the outer side of the extension unit 403*a*.

The rotary damper 450 is mounted in the front casing 310. The rotary damper 450 reduces the moving speed of the slider 400 that is elastically supported so as to be pressurized by the torsion spring 470 from the first position to the second position.

In addition, as the gear unit 450 is meshed with plurality of gear teeth 404 formed on the extension unit 403*a*, the rotary damper 450 maintains a user setting angle of the photographing unit 500 at a certain point between the second position and the third position.

In this case, as a size of the plurality of gear teeth 404 and a size of the gear unit 451 are formed to be small, a moving distance of the slider 400 according to a rotation angle of the gear unit 451 may become shorter. Accordingly, the predetermined angle of the photographing unit 500 may be controlled more finely in a section between the second position and the third position.

The torsion spring 470 is fixed to a fixing protrusion 316 formed on the front casing 310. A first lead 471 of the torsion spring 470 is fixed to a first stopping unit 405 formed in the slider 400, and a second lead 473 of the torsion spring 470 is fixed to a second stopping unit 317 formed in the front casing 310.

The first lead 471 of the torsion spring 470 pressurizes the slider 400 elastically from the first position to the second position. Consequently, in response to locking at the first position being released, the slider 400 moves to the second position by the elasticity of the first lead 471.

In this case, a distance where the slider 400 moves by the elasticity of the first lead 471 belongs to a section to the second position, which is performed as the first lead 471 is interfered by a stopping protrusion 318 formed on the front casing 310. Accordingly, a coverage range of the elasticity of the first lead 471 with respect to the slider 400 belongs to a section from the first position to the second position.

Meanwhile, the slider 400 is controlled by a torque of the rotary damper 450, not the elasticity of the torsion spring 470, between the second position and the third position. Consequently, the photographing unit 500 may be set to be at a certain point between the second position and the third position through a gear connection between the rotary damper 450 and the extension unit 403*a* of the slider 400.

The locking member 490 is engaged with the slider 400 and includes the hook 491 that is detachably locked to the locking protrusion 335 (refer to FIG. 3) such that the slider 400 remains the first position.

In response to a user's pressing operation being performed and then released with respect to the front end surface 501 of photographing unit 500 at the first position in an inserting direction of the photographing unit 500 (a direction where the photographing unit 500 is inserted in the auxiliary casing 300), the hook 491 is unlocked out of the locking protrusion 335. The locking member 490 may have a common push-locking structure so as to realize the above-described locking/unlocking operation.

The photographing unit 500 detects a user's gesture and arranged in the auxiliary casing 300 slidably.

Figure 8:
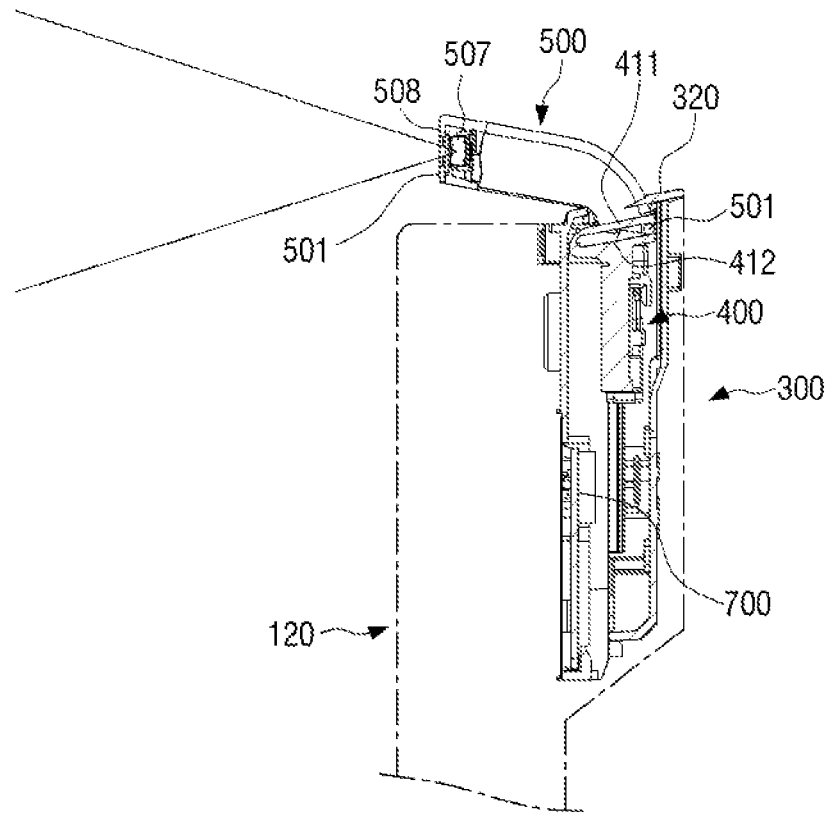
FIG. 8 is a sectional view taken along 'B-B' of FIG. 7.

As illustrated in FIG. 8, the photographing unit 500 includes a camera module 507, and a window 508 is arranged in front of the camera module 507. The camera module 507 is electrically connected to the interaction control board 700 through a flexible signal cable (not shown) that accesses the interaction control board 700 by passing through an inside of the photographing unit 500.

When the photographing unit 500 does not perform the photographing operation, the photographing unit 500 is received at the first position, that is, in the auxiliary casing 300. In this case, the front end surface 501 of the photographing unit 500 may be located on the same flat surface as the upper surface 320 of the front casing 310 so as not to protrude further than the upper surface 320. The structure may prevent a part of the photographing unit 500 from protruding from the upper surface 320 at the first position thereby spoiling overall aesthetic of the display device 100.

As described above, the photographing unit 500 is hinge-engaged and operates with the slider 400. Accordingly, the photographing unit 500 may be set to be at any one of the first to third positions. In addition, the photographing unit 500 has a slip-resistant unit 505 (refer to FIG. 4) consisting of a plurality of protrusions on an outer surface of the photographing unit 500 such that the user is easily able to perform the vertical angle control in an arrow R1 direction or in an arrow R2 direction shown in FIG. 4, between the second position and the third position.

Meanwhile, in performing the vertical angle control with respect to the photographing unit 500 between the second position and the third position in order to adjust the view angle of the camera of the photographing unit 500, in response to the photographing unit 500 excessively being pushed and rotated towards the first position over the second position through the slip-resistant unit 505, the slider 400 moves downwards along with the photographing unit 500. In this case, the first stopping unit 405 of the slider 400 is supported elastically by the first lead 471, and the photographing unit 500 returns to the second position.

Accordingly, the user may locate the photographing unit 500 at a proper point between the second position and the third position to set a desired view angle of the camera.

Hereinafter, the operations of the display device 100 will be described with reference to FIGS. 5 to 12.

Figure 7:
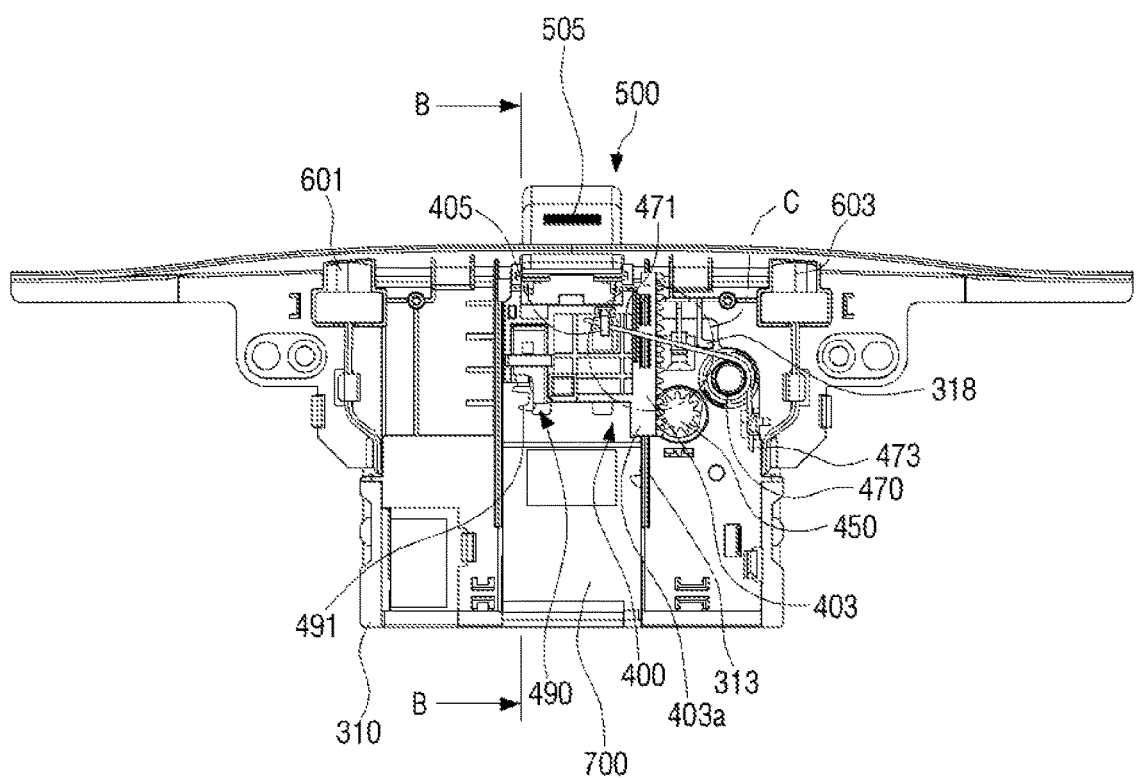
FIG. 7 is a diagram of the auxiliary casing without a rear casing, provided to describe an example where the photographing unit is arranged at the second position.
Figure 9:
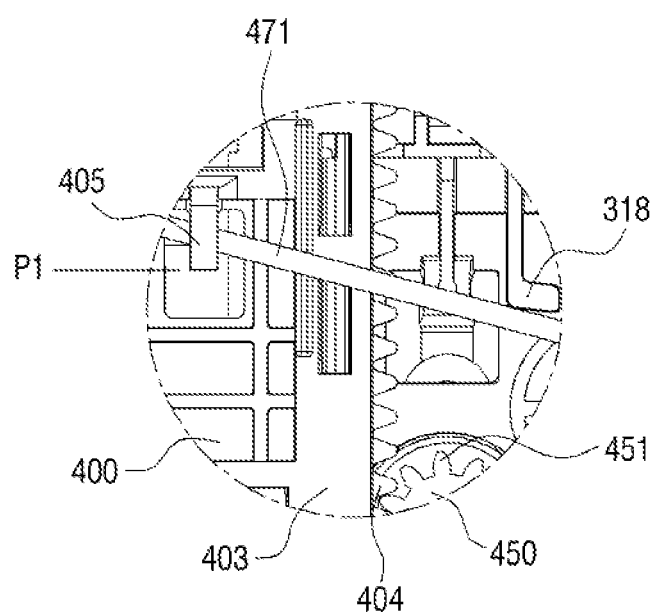
FIG. 9 is an expanded view of 'C' of FIG. 7.
Figure 12:
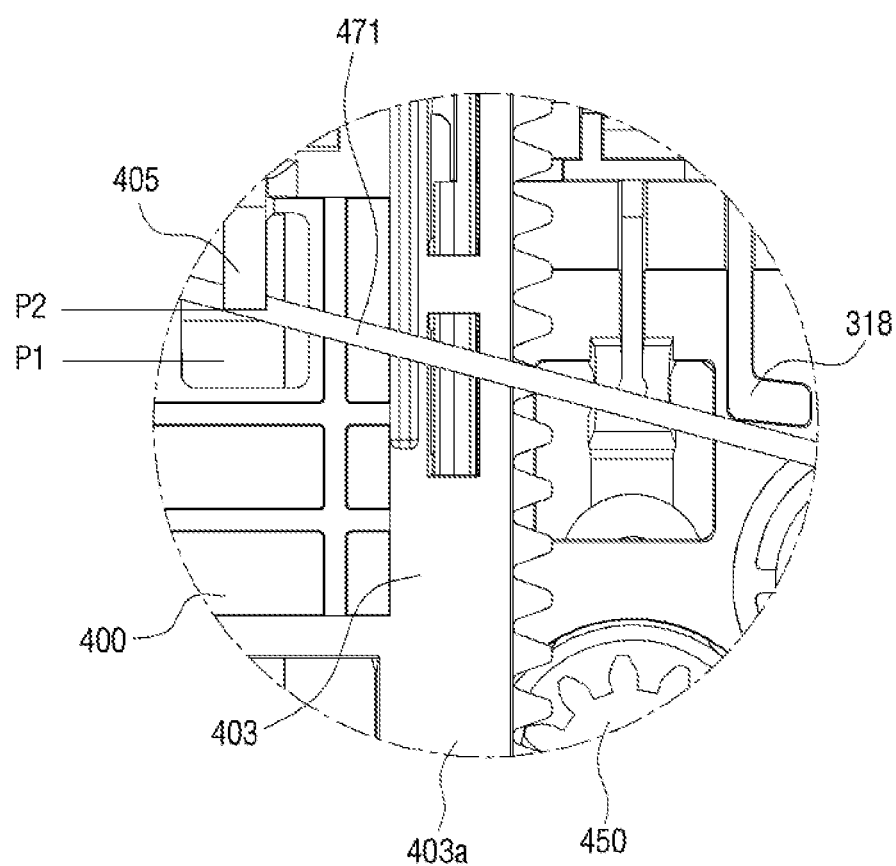
FIG. 12 is an expanded view of 'F' of FIG. 10.

FIG. 5 is a diagram of the auxiliary casing without a rear casing, provided to describe an example where the photographing unit is arranged at the first position. FIG. 6 is an expanded view of 'A' of FIG. 5. FIG. 7 is a diagram of the auxiliary casing without a rear casing, provided to describe an example where the photographing unit is arranged at the second position. FIG. 8 is a sectional view taken along 'B-B' of FIG. 7. FIG. 9 is an expanded view of 'C' of FIG. 7. FIG. 10 is a diagram of the auxiliary casing without a rear casing, provided to describe an example where the photographing unit is arranged at a third position. FIG. 11 is a sectional view taken along 'E-E' of FIG. 10. FIG. 12 is an expanded view of 'F' of FIG. 10.

Referring to FIG. 5, when the photographing unit 500 does not perform the photographing operation, the hook 491 of the locking member 490 is locked to the locking protrusion 335, and the photographing unit 500 being hinge-engaged with the slider 400 is arranged at the first position where the photographing unit 500 is received in the auxiliary casing 300.

In this state, in response to the photographing unit 500 being moved to the second position where the photographing unit 500 projects outward from the auxiliary casing 300 in order to photograph a user's gesture by means of the photographing unit 500, the front end surface 501 of the photographing unit 500 is pressed in the inserting direction of the photographing unit 500 (the direction where the photographing unit 500 is inserted in the auxiliary casing 300), and the hook 491 locked to the locking protrusion 335 is unlocked out of the locking protrusion 335.

Subsequently, in response to a force applied to the front end surface 501 of the photographing unit 500 being removed, the slider 400 ascends towards the upper surface 320 of the front casing 310 by the elasticity of the first lead 471 of the torsion spring 470.

Consequently, as illustrated in FIG. 8, the photographing unit 500 operates with the slider 400 and projects outward from the auxiliary casing 300 through the opening 321 (refer to FIG. 3) of the upper surface 320 with drawing a certain curved trajectory.

While the photographing unit 500 moves from the first position to the second position, an ascending speed of the slider 400 being gear-engaged with the rotary damper 450 is reduced, and thus, the slider 400 operates gently.

The first lead 471 of the torsion spring 470 is interfered by the stopping protrusion 318 at the second position, and thus, the first lead 471 does not exert the elasticity to the slider 400 any more. However, the slider 400 remains being affected by the torque of the rotary damper 450.

The photographing unit 500 may be set in a vertical direction at a certain angle in order to adjust the view angle of the camera, between the second position and the third position where the photographing unit 500 projects outward from the auxiliary casing 300.

In response to the angle of the photographing unit 500 being controlled, as illustrated in FIG. 4, the slip-resistant unit 505 in the photographing unit 500 may be pushed in the arrow R1 direction or in the arrow R2 direction so as to rotate the photographing unit 500 by an amount of a user's desired angle.

In this case, the slider 400 is affected by the torque of the rotary damper 450 through the extension unit 403a, and thus, the photographing unit 500 is fixed so as to maintain the angle at a certain point between the second position and the third position.

Referring to FIGS. 10 and 11, the third position may correspond to a lowermost end where the photographing unit 500 that projects outward from the auxiliary casing 300 may rotate downwards. In this case, a part of the photographing unit 500 located inside the upper surface of the front casing 310 is interfered by the front casing 310, and thus, the photographing unit 500 is limited so as not to rotate downwards any more from the third position.

Meanwhile, the section between the second position and the third position belongs to an adjustment range where the user may adjust the view angle of the camera of the photographing unit 500. The slider 400 ascends in a section between P1 of FIG. 9 and P2 of FIG. 12 to correspond to the adjustment range.

As described above, the display device 100 according to an embodiment may be realized so as to make the photographing unit 500 project outward from the auxiliary casing 300 or to adjust the view angle of the camera of the photographing unit 500 by using the components for inserting the photographing unit 500 in the auxiliary casing 300.

Consequently, the display device 100 according to an embodiment may omit a complex adjustment structure that is separately assembled in the photographing unit 500 to adjust the view angle of the camera of the photographing unit 500 as in the conventional art. As the complex adjustment structure is omitted, the inside of the photographing unit 500 may be sealed, thereby preventing various foreign substance from being brought into the photographing unit 500.

Hereinafter, a structure of the display device according to the second embodiment will be described with reference to FIGS. 13 to 16.

Figure 13:
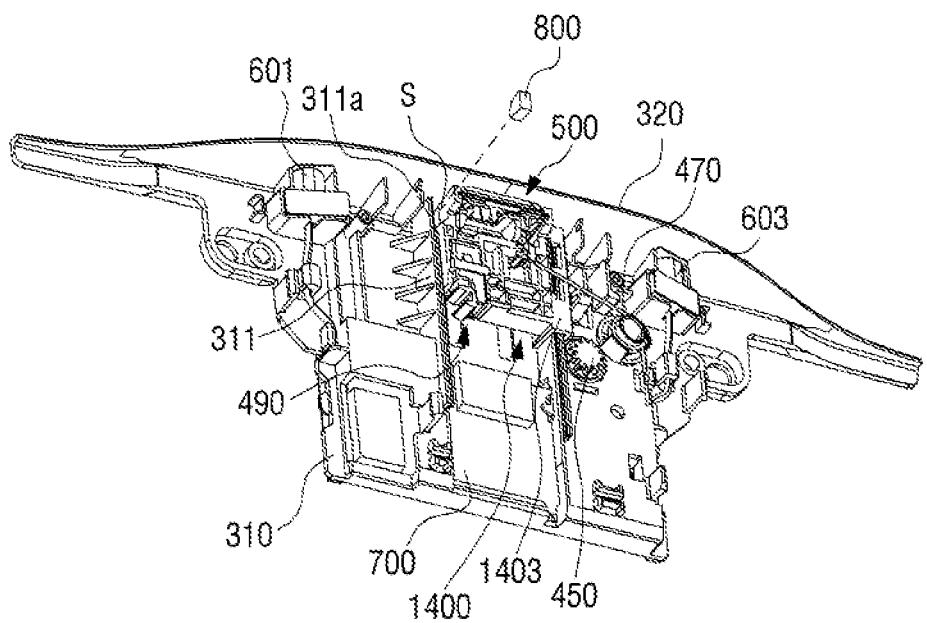
FIG. 13 is a perspective view illustrating a front casing of the display device and a friction member for adjusting a view angle of a camera of the photographing unit, according to a second embodiment.
Figure 14:
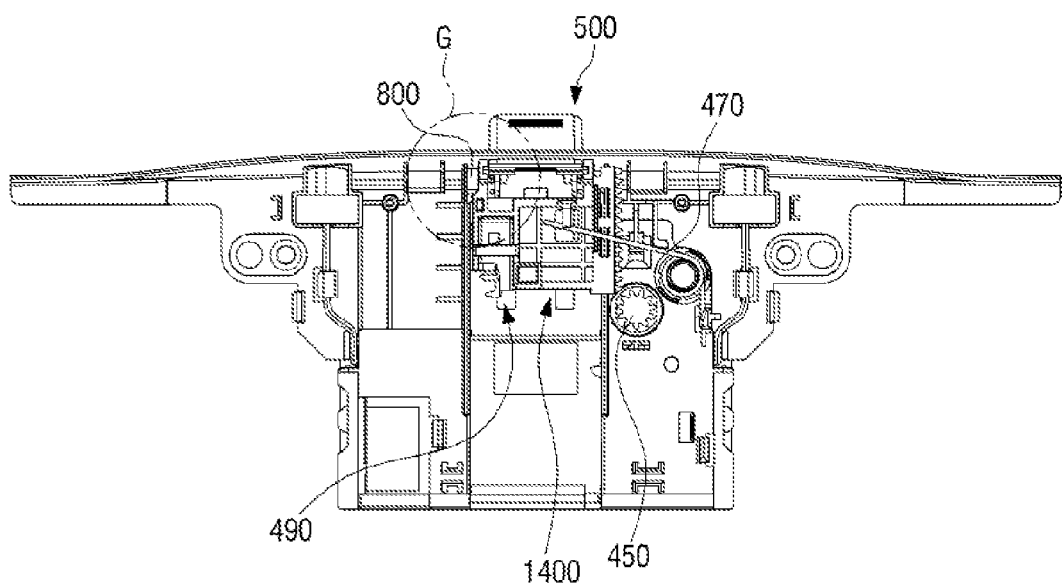
FIG. 14 is a diagram provided to describe an example where the friction member of FIG. 13 is engaged with the front casing.
Figure 15:
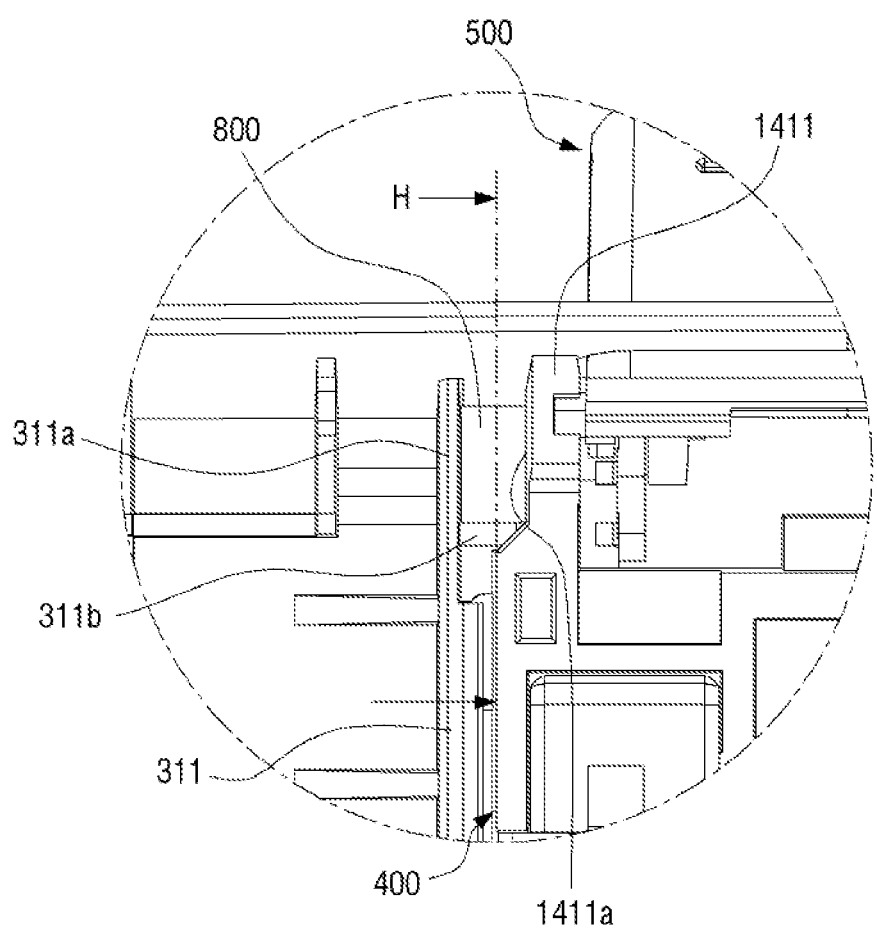
FIG. 15 is an expanded view of 'G' of FIG. 14.
Figure 16:
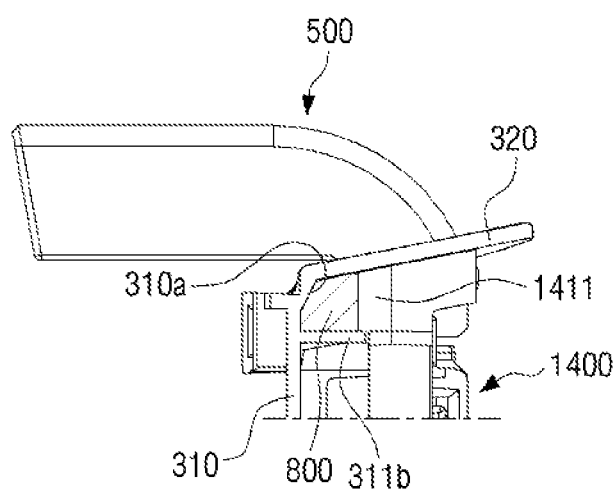
FIG. 16 is a sectional view taken along 'H-H' of FIG. 15.

FIG. 13 is a perspective view illustrating a front casing of the display device and a friction member for adjusting a view angle of a camera of a photographing unit, according to the second exemplary embodiment. FIG. 14 is a diagram provided to describe an example where the friction member of FIG. 13 is engaged with the front casing. FIG. 15 is an expanded view of 'G' of FIG. 14. FIG. 16 is a sectional view taken along 'H-H' of FIG. 15.

The display device according to the second embodiment includes the same components as the display device according to the first embodiment, except for some component. That is, the display device of the second embodiment is different from the display device of the first embodiment in terms of a component for keeping the photographing unit 500 at a certain angle between the second position and the third position (that is, the gear connection between the extension unit 403a of the slider 400 and the rotary damper 450). Accordingly, hereinafter, only the component different from the component of the first embodiment will be described in detail.

Referring to FIG. 15, a friction member 800 is arranged in a space (S, refer to FIG. 13) formed by a first protruding unit 311a extended from an upper end of the first guide rail 311 of a front case 300, a second protruding unit 311b protruding perpendicularly to the first protruding unit 311a, and a part of part of inner circumferential surface 310a of the front casing 310.

In this case, it is preferred that the friction member 800 is arranged on any one of the first protruding unit 311a, the second protruding unit 311b, and the part of inner circumferential surface 310a of the front casing 310. In addition, the friction member 800 may be made of a material having a frictional force and certain elasticity, for example, rubber or synthetic resin (urethane resin and so on).

In response to the photographing unit 500 moving from the first position to the second position, the friction member 800 is put between a first protruding wall 311a and a first connection unit 1411 of a slider 1400. In this case, the slider 1400 has certain fixation power by the elasticity of the friction member 800 and the frictional force that occurs between an outer surface of the first connection unit 1411 and the friction member 800.

Consequently, in response to the angle of the photographing unit 500 being set to be the arrow R1 direction or the R2 direction by the user (refer to FIG. 4), the fixation power is given to the slider 1400 by the friction member 800, and thus, the photographing unit 500 is fixed at the user setting angle.

As described above, in the second embodiment, the vertical angle of the photographing unit 500 is maintained by the friction member 800 between the second position and the third position. Accordingly, as illustrated in FIG. 14, the slider 1400 may omit an extension unit corresponding to the extension unit 403a (refer to FIG. 10) of the slider 400 according to the first embodiment.

INDUSTRIAL APPLICABILITY

The present general inventive concept generally relates to a display device for providing user interaction.

What is claimed is:

1. A display device for providing user interaction, the display device comprising:
   a display body;
   a photographing assembly including a camera to detect a user's gesture; and
   a driving member to selectively move the photographing assembly to a selected position from a first position where the photographing assembly is received in the display body, a second position, and a third position where the photographing assembly projects outward from the display body during photographing,
   wherein the driving member controls the photographing assembly to be fixed at a certain point in a section between the second position and the third position,
   wherein the driving member comprises:
      a slider being hinge-engaged with the photographing assembly,
      a speed reducing member, in response to the photographing assembly moving from the first position to the second position, to reduce a moving speed of the slider and keeping a predetermined angle of the photographing assembly in the section between the second position and the third position,
   wherein the speed reducing member is a rotary damper being gear-engaged with the slider, and
   wherein the slider comprises:
      an engagement member being gear-engaged with the rotary damper in a section between the first position and the second position, and
      an extension member being gear-engaged with the rotary damper in the section between the second position and the third position.

2. The display device as claimed in claim 1, wherein in response to the photographing assembly moving from the first position to the second position, the driving member controls a moving speed of the photographing assembly and keeps the photographing assembly at the predetermined angle in the section between the second position and the third position.

3. The display device as claimed in claim 1, wherein the driving member comprises:
   a locking member included in the slider to fix a position of the slider such that the photographing assembly is kept fixed at the first position;
   an elastic member for elastically supporting the slider such that the photographing assembly moves from the first position to the second position.

4. The display device as claimed in claim 3, wherein the elastic member supports the slider elastically in the section between the first position and the second position.

5. The display device as claimed in claim 3, wherein the slider comprises a first elongated hole and a second elongated hole in which a first hinge protrusion and a second hinge protrusion are slidably inserted, on an upper part of the slider, the first hinge protrusion and the second hinge protrusion protruding from both sides of the photographing assembly,
   wherein the first elongated hole and the second elongated hole are arranged symmetrically to each other and angled to a certain side.

6. The display device as claimed in claim 3, wherein the elastic member is a torsion spring.

7. The display device as claimed in claim 1, wherein the driving member comprises:
   a locking member being included in the slider to fix a position of the slider such that the photographing assembly is kept fixed at the first position,
   an elastic member to elastically support the slider such that the slider moves from the first position to the second position, and
   a friction member to keep the photographing assembly at the predetermined angle in the section between the second position and the third position.

8. The display device as claimed in claim 7, wherein the friction member is fixed to the display body and pressurizes a part of the slider elastically in the section between the second position and the third position.

9. The display device as claimed in claim 8, wherein the friction member comes into surface-contact with a certain surface of an upper part of the slider.

10. The display device as claimed in claim 7, wherein the friction member is made of rubber or synthetic resin with elasticity.

11. The display device as claimed in claim 1, wherein the second position is an uppermost position when the photographing assembly projects outward from the display body, and the third position is a lowermost position when the photographing assembly projects outward from the display body.

12. The display device as claimed in claim 1, wherein the photographing assembly includes a slip-resistant member on an outer circumferential surface.

13. A display device for providing user interaction, the display device comprising:
- a display body including a main casing and an auxiliary casing being detachably mounted on a rear surface of the main casing;
- a photographing assembly being arranged in the auxiliary casing and including a camera module for detecting a user's gesture; and
- a driving member being arranged in the auxiliary casing and connected to the photographing assembly so as to operate with the photographing assembly, the driving member controlling the photographing assembly to be fixed at a certain point in a section between the second position and the third position, wherein the driving member comprises:
- a slider being hinge-engaged with the photographing assembly,
- a speed reducing member, in response to the photographing assembly moving from the first position to the second position, to reduce a moving speed of the slider and keeping a predetermined angle of the photographing assembly in the section between the second position and the third position, wherein the photographing assembly moves to a first position where the photographing assembly is received in the auxiliary casing by operating with the driving member, a second position, and a third position where the photographing assembly projects outward from the display body during photographing, wherein the speed reducing member is a rotary damper being gear-engaged with the slider, and wherein the slider comprises:
- an engagement member being gear-engaged with the rotary damper in the section between the first position and the second position; and
- an extension member being gear-engaged with the rotary damper in the section between the second position and the third position.

* * * * *